April 29, 1958 H. BIERI 2,832,882
RESISTANCE WELDING MACHINES
Filed March 15, 1956
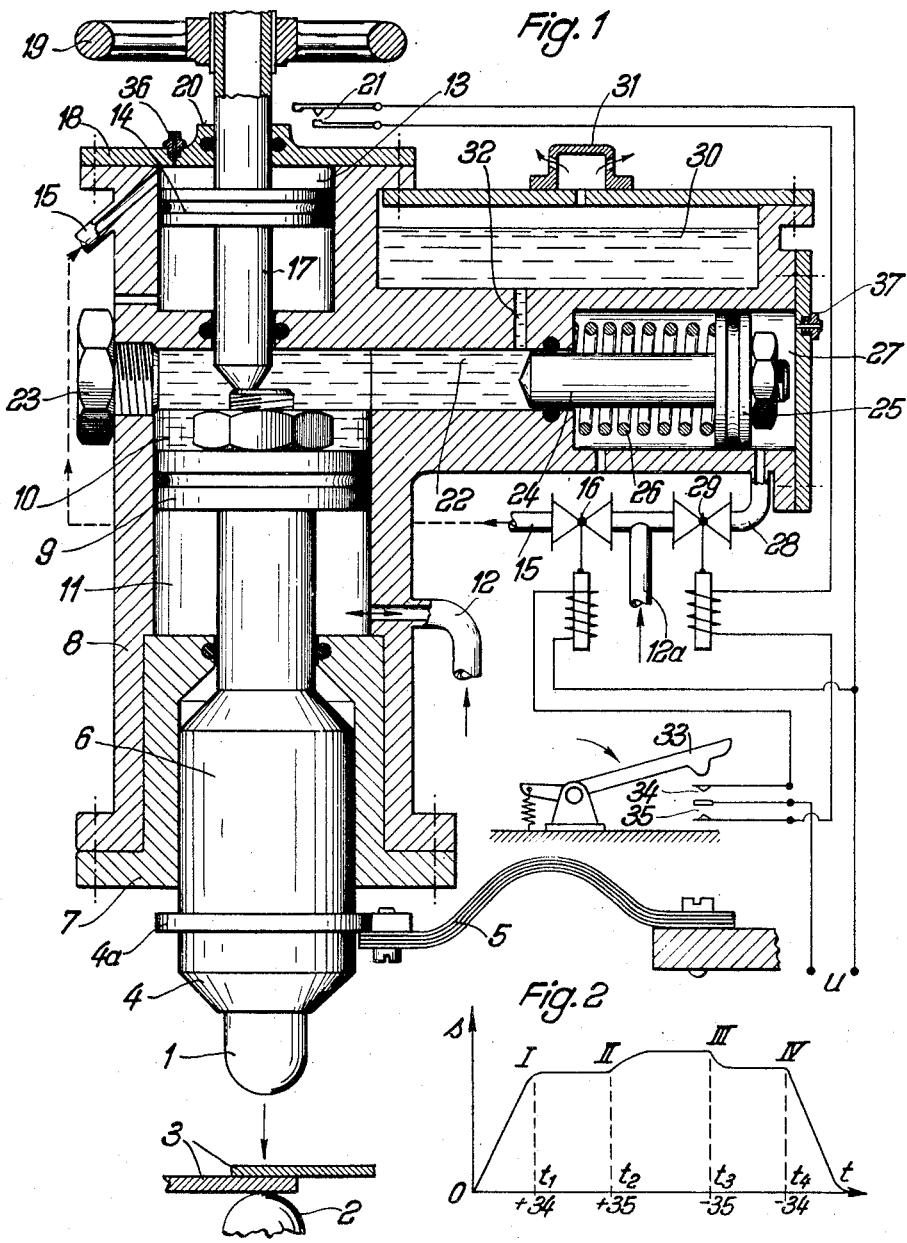
Inventor:
Hans Bieri
by:
Michael J. Striker
Attorney

United States Patent Office 2,832,882
Patented Apr. 29, 1958

2,832,882

RESISTANCE WELDING MACHINES

Hans Bieri, Schlieren, Zurich, Switzerland, assignor to H. A. Schlatter Aktiengesellschaft, Zollikon (Zurich), Switzerland, a company of Switzerland Application March 15, 1956, Serial No. 571,818

9 Claims. (Cl. 219—89)

In resistance welding machines the work pieces must be kept during the welding operation under high pressure (the so-called welding pressure) by the electrodes. For this purpose at least one of the two welding electrodes is made movable, and this electrode is further equipped with a mechanical, pneumatic or hydraulic feed action. To enable the work pieces to be conveniently inserted between the electrodes, such feed action must have a considerable length of stroke or travel; but the high welding pressure obviously only requires to be applied (after the work pieces have been loosely gripped) over the last, short part of the feed stroke during which pressure contact is attained and the work pieces become deformed during the welding process. Therefore it is usual to resolve the length of this feed stroke into two stages that are performed with different amounts of force or power. For instance, if a toggle mechanism is used for the movable electrode, the advance during the second part of the feed stroke is performed with greater force but at a lower speed than the advance during the first part. In present day practice, however, pneumatic drives are used in order to save space; but with these it was not possible heretofore to perform the last part of the stroke with sufficient force or at a sufficiently low speed; on the contrary, the electrodes were pressed together for performing the welding operation with excessive suddenness.

The present invention relates to a welding machine with pneumatically operated two-stage feed action, the first stage of which (the setting stroke) is performed by direct, pneumatic drive and consequently with low power and relatively high speed, and in the second stage of which (the welding stroke) a hydraulic press is employed as an intermediate link, thus obtaining a slow advance motion with great power or pressure. The pressure rise takes place very rapidly, as soon as the electrodes and the work pieces are in positive contact.

In the welding machine of the invention the movable electrode is mechanically linked with a hydraulic ram (henceforth called the "main ram"). This main ram receives the mechanically transmitted pressure of a controlled-stroke, pneumatically operated "auxiliary ram" which propels the main ram during the controlled, first step of the feed action, the "setting stroke." The cylinder of the hydraulic main ram (henceforth called the "main cylinder") is, during this first stage of the feed action, in communication through a controllable opening or port, with a working fluid container in such a manner as to be able to obtain working fluid therefrom at will. The main cylinder is also in communication with a "displacement cylinder" which is filled with working fluid and the pneumatically-actuated "displacement plunger" whereof firstly closes the aforesaid port and thereupon initiates the second stage of the feed action of the electrode by pressing the fluid contents of the displacement cylinder into the main cylinder; the main ram then propels the electrode during the second stage of the feed action or "welding stroke."

The mechanical transmission of the force from the auxiliary ram to the main ram can for instance be effected by a system of levers or a connecting rod. A particularly compact arrangement is obtained if the main cylinder and the smaller bored auxiliary cylinder are arranged axially parallel in series and the auxiliary ram is made to drive the main ram eccentrically through a connecting rod. The stroke of the auxiliary ram is most suitably controlled by a movably adjustable end stop.

The controllable opening or port through which the main cylinder communicated during the first stage of the feed action with the working fluid container may be provided with a mechanically, electrically or pneumatically actuated control valve closing before initiation of the second stage of the feed action. Most simply however this opening is made in the form of a cylindrically slotted port located in the path of the displacement plunger; this displacement plunger then itself closes said port before applying the hydraulic pressure to the main ram. In order to prevent premature starting of the displacement plunger stroke, a safeguard is preferably provided in the inlet to the pneumatic drive thereof in the form of a valve mechanically, pneumatically or electrically actuated by the auxiliary ram, which valve, being locked by the action of the auxiliary ram, is only permitted to open when the auxiliary ram approaches its stroke-limiting end stop.

The invention will be fully understood from the following detailed description and the accompanying drawing which shows one embodiment by way of example.

Fig. 1 represents a diagrammatic vertical section through the clamping head of the machine.

Fig. 2 depicts a motion diagram of the movable electrode.

The purpose of the clamping head shown is to move the electrode 1 downwards in the direction of the arrow and force it towards the counter electrode 2 supporting the work pieces 3, with the necessary welding pressure. The electrode 1 is held in a chuck 4 to which a current feeder 5 is attached, and a plunger 6 rigid with the chuck is guided in a bush 7 held in a casting 8 which forms a part of the machine housing. The upper, reduced part of the plunger 6 carries the aforesaid main ram 9 which slides in a wide, cylindrical bore of the casting 8. The chamber of this main cylinder situated above the main ram 9 is designated 10 and is assumed to be filled with a working fluid (e. g. oil). The cylinder chamber 11 situated below the ram 9 is connected with a compressed air pipe 12.

A separate auxiliary cylinder 13 is fitted above the main cylinder 10, and contains the aforesaid auxiliary ram 14. The cylinder space above the auxiliary ram 14 is connected through a pipe 15 and a magnetic valve 16 with a compressed air pipe 12a. The lower end of the rod 17 of the auxiliary ram 14 rests on the head of the plunger 6; the upper end of the rod 17 projects through the cylinder cover 18 and carries a handwheel 19. This handwheel acts in conjunction with an annular shoulder 20 on the cylinder cover 18 as an adjustable limiting stop for the downstroke of the auxiliary ram 14. Shortly before the handwheel 19 makes contact with the annular shoulder 20, it closes a safety contact 21.

The chamber 10 of the main cylinder communicates with a lateral cylindrical bore 22 which is closed on the left by a screw plug 23. This bore contains on the right a displacement plunger 24. This displacement plunger 24 is pneumatically actuated by an appreciably larger piston 25. In the rest position shown, the piston 25 is forced to the extreme right by the pressure of a spring 26. The compressed air chamber 27 of the driving piston 25 communicates through a pipe 28 and a magnetic valve 29 with the compressed air pipe 12a.

Above the displacement cylinder 22 is an oil tank 30 which is vented through a drilled cap 31. This oil tank communicates with the displacement cylinder 22 through a cylinder port 32 located immediately next to the end position of the displacement plunger 24.

The machine is controlled in known manner by a treadle lever 33 actuating the contacts of the electric control circuits. This treadle is shown diagrammatically on the right of Fig. 1. When actuated, the treadle first closes a contact 34 which applies a voltage U to open the magnetic valve 16. It next closes a contact 35 which applies a voltage U to open the magnetic valve 29 as soon as the safety contact 21 has been closed. For the release of the compressed air after the closing of the magnetic valves 16, 29, each of the two cylinder spaces 13, 27 can be provided with an additional magnetic valve. In Fig. 1, for the sake of simplicity, two vents 36, 37 are shown fulfilling this purpose.

The diagram in Fig. 2 shows the path "a" of the motion of the electrode 1, against the time "t." It is assumed that at the time $t_0$ the contact 34 and at the time $t_2$ the contact 35 are closed; and also, that at the time $t_3$ after completion of the weld, the contact 35, and at the time $t_4$ the contact 34, are again open.

In the rest position, the main ram 9 is driven upwards by compressed air entering through the pipe 12, until the collar 4a on the chuck 4 makes contact with the bush 7. At the same time, oil contained in the upper space 10 of the main cylinder is forced through the cylinder port 32 back into the oil tank 30. Simultaneously, the auxiliary ram 14, relieved of pressure, is raised into its top position. In this position of the electrode 1, the work pieces can conviently be inserted in the electrode gap and adjusted there.

When now, by operating the treadle 33, the contact 34 is closed, the magnetic valve 16 is opened and compressed air entering above the auxiliary ram 14 presses this ram downwards; simultaneously, the rod 17 also moves the main ram 9 and the electrode 1 downwards. This pneumatically effected motion, however, proceeds shock free, since oil drawn through the cylinder port 32 from the space 10 of the main cylinder acts as a fluid buffer. This ends as soon as the handwheel 19 has made contact with the shoulder 20, thus arresting the motion of the auxiliary ram 14. By suitably adjusting the handwheel 19, it is thus possible to set the stroke "a" of the first feed action stage $t_0$—$t_1$ (Fig. 2), to any desired length. This length of stroke is suitably so selected that the electrode 1 is at the end of this portion of its travel, about 0.5–1 mm. over the work-pieces 3, or just makes contact with them.

When, at the time $t_2$, the treadle 33 is again operated to close the contact 35, the safety contact 21 in series therewith is already closed and the magnetic valve 29 consequently opens immediately. Consequently, the chamber 27 becomes charged with compressed air which forces the piston 25 against the action of the spring 26 to the left. This causes the displacement plunger 24 attached to the piston 25 firstly to close the cylinder port 32 and next to compress the fluid in the upper space 10 of the main cylinder. Owing to this, the main ram 9 with the plunger 6 and the electrode 1 moves down hard into contact with the workpieces 3. Immediately this contact has taken place, the pressure exerted by the main ram 9 on the electrode 1 rises to a very high value; this is due on the one hand to the air pressure existing in the chamber 27 and acting on the displacement plunger 24, and on the other hand—according to the principle of the hydraulic press—to the ratio of the cross-sectional areas of the displacement plunger 24 and the main ram 9.

When the welding operation has been completed, the operator first opens the contact 35, whereupon the magnetic valve 29 closes and the spring 26 presses the plunger 24 against the falling pressure of the exhausting air, again to the right. This causes the main ram 9 with the electrode 1 to rise until the head of the plunger 6 again makes contact with the rod 17 of the auxiliary ram 14 (stage III—IV of the feed action, see Fig. 2). If the contact 34 is also now opened, the valve 16 closes and the air pressure above the auxiliary ram 14 sinks to zero. The compressed air entering underneath the main ram 9 from the pipe 12 now raises both rams again until the collar 4a makes contact with the bush 7. The machine is now ready for the next welding operation.

As will be seen, the hydraulic action of the main ram 9 acts only as an intermediate link for obtaining a shock free, very short stroke with a high end pressure. The actual working fluid for all motions is ordinary compressed air. It will further be seen that an exceedingly compact and space saving arrangement of the mechanism is obtained, the bulk of which can be further reduced by moving the cylinder of the auxiliary ram 14 to the left away from the axis of the main cylinder 10, 11.

The return stroke of the piston 25 can be performed by compressed air instead of by a spring, the air being admitted into the cylinder space to the left of the piston 25 as soon as the valve 29 closes. It is even more suitable to provide a separate return piston for this purpose, in order that the cylinder space to the left of the piston 25 shall always remain free from pressure.

In practice it is not always necessary to raise the electrode 1 completely after each welding stroke. It is, for instance, sufficient in the case of so-called "spot seam welds" ("stitch welds") to raise the electrode 1 between welding strokes only by about 1–2 mm. in order to be able to move the work forward in the direction of the seam. Contact 34 then remains continuously closed (i. e. the magnetic valve 16 is continuously open) and the individual (spot) welds are made only by the action of the piston plunger assembly 25, 24 controlled by the contact 35. In such case it is possible by suitably adjusting the handwheel 19 to set the fixed stroke of the auxiliary ram 14, and hence the action of the main ram 9 at any desired value.

The spot welding electrode shown can, of course, in making seam welds, be replaced by any convenient, known form of contact roller.

What I claim is:

1. In a resistance welding machine, in combination, a movable welding electrode; hydraulic means carrying said electrode, said hydraulic means including a hydraulic pressure liquid; first pneumatic means cooperating with said hydraulic means for acting on the same to move said electrode from a rest position at a relatively fast speed almost up to a welding position without building up a a pressure in said pressure liquid; and second pneumatic means cooperating with said hydraulic means by increasing the pressure of said liquid for actuating said hydraulic means to move the electrode at a relatively slow speed beyond the position to which it has moved during operation of said first pneumatic means to said welding position and to apply a high pressure to said electrode while it remains in the welding position, said second pneumatic means operating after said first pneumatic means operates.

2. In a resistance welding machine, in combination, a stationary cylinder; piston means slidable in said cylinder; a movable welding electrode carried by said piston means for movement therewith; a hydraulic pressure liquid reservoir; passage means communicating with said reservoir and with said cylinder at a side of said piston means opposite from said electrode for leading said pressure liquid from said reservoir to said cylinder; first pneumatic means acting on said piston means for shifting the same in said cylinder to move said electrode almost up to the welding position without building up the pressure of said liquid; stop means cooperating with said first pneumatic means for limiting the extent to which the latter shifts said piston means; and second penumatic means acting after said first pneumatic means and communicating with said passage means for closing off communication between said cylinder and reservoir and for building up the pressure of the liquid in said cylinder to shift said piston means beyond the position to which it is moved by said first pneumatic means at a slower rate than it is moved by said first pneumatic means for placing said electrode in its welding position and for applying a high pressure to said electrode while it is in said welding position.

3. In a resistance welding machine, in combination, a stationary cylinder; piston means slidable in said cylinder; a movable welding electrode carried by said piston means for movement therewith; a hydraulic pressure liquid reservoir; passage means communicating with said reservoir and with said cylinder at a side of said piston means opposite from said electrode for leading said pressure liquid from said reservoir to said cylinder; first pneumatic means acting on said piston means for shifting the same in said cylinder to move said electrode almost up to a welding position without building up the pressure of said liquid; stop means cooperating with said first pneumatic means for limiting the extent to which the latter shifts said piston means; second pneumatic means communicating with said passage means for closing off communication between said cylinder and reservoir and for building up the pressure of the liquid in said cylinder to shift said piston means beyond the position to which it is moved by said first pneumatic means for placing said electrode in its welding position and for applying a high pressure to said electrode while it is in said welding position; and control means operatively connected to said first and second pneumatic means for first actuating said first pneumatic means and for actuating said second penumatic means after said first pneumatic means operates.

4. In a resistance welding machine as recited in claim 3, said first pneumatic means comprising a second cylinder having an end wall separating the same from said first-mentioned cylinder, said wall being formed with an opening passing therethrough, a piston slidable in said second cylinder, and a piston rod extending from the latter piston fluid-tightly through said wall opening into engagement with said piston means so that when said piston in said second cylinder moves toward said piston means said piston rod shifts said piston means in said first-mentioned cylinder.

5. In a resistance welding machine as recited in claim 4, the axis of said second cylinder being parallel to and spaced from the axis of said first-mentioned cylinder.

6. In a resistance welding machine as recited in claim 4, said second cylinder having a second end wall spaced from said first-mentioned end wall and formed with an opening passing therethrough, and said stop means comprising a second piston rod fixed to said piston in said second cylinder and extending therefrom fluid-tightly through said opening of said second end wall to the exterior of said second cylinder, said second piston rod being threaded at the exterior of said second cylinder, and said stop means further including a member threadedly carried by said second piston rod at the exterior of said second cylinder for engaging said second end wall thereof to limit the movement of said piston of said second cylinder.

7. In a resistance welding machine as recited in claim 6, said control means including a switch located in the path of movement of said member carried by said second piston rod to be closed by the latter member when it engages said second wall of said second cylinder, said second pneumatic means being operable only when said switch is closed.

8. In a resistance welding machine as recited in claim 3, said passage means including an elongated plunger-receiving portion extending to said cylinder and a bore extending laterally from said plunger-receiving portion to said reservoir, said second pneumatic means including a plunger longitudinally shiftable in said plunger-receiving portion of said passage means from a rest position where said plunger is located adjacent to and uncovers said bore, so that during operation of said second pneumatic means said plunger shifts longitudinally in said plunger-receiving portion to close said bore and increase the pressure of the liquid in said cylinder.

9. In a resistance welding machine as recited in claim 3, said control means including a lever capable of being moved by the operator, a first switch located in the path of movement of said lever to be closed thereby, a second switch located in the path of movement of said first switch to be closed after said first switch is closed, a first solenoid valve connected electrically with said first switch to be opened when the latter switch is closed, said first valve communicating with said first pneumatic means, a second solenoid valve connected electrically with said second switch to be opened when the latter switch closes, said second valve communicating with said second penumatic means, and a third switch connected in the circuit of said second valve and located in the path of movement of said stop means to be closed when the latter prevents further movement of said first pneumatic means, so that even if said second switch is closed said second pneumatic means will not operate until said third switch closes.

References Cited in the file of this patent

UNITED STATES PATENTS

| | | |
|---|---|---|
| 2,312,938 | Stieglitz | Mar. 7, 1943 |
| 2,331,537 | Clark | Oct. 12, 1943 |
| 2,358,826 | Purat | Sept. 26, 1944 |
| 2,470,074 | Manning | May 10, 1949 |